United States Patent [19]
Yamamichi et al.

[11] 3,852,779
[45] Dec. 3, 1974

[54] RELEASE DEVICE FOR A CAMERA HAVING A MEMORY TYPE ELECTRONICS TIME CONTROL DEVICE

[75] Inventors: Masayoshi Yamamichi, Kanagawa-ken; Hiroshi Aizawa, Tokyo, both of Japan

[73] Assignee: Canon Kabushiki Kaisha, Tokyo, Japan

[22] Filed: June 29, 1973

[21] Appl. No.: 375,034

[30] Foreign Application Priority Data
July 5, 1972   Japan.............................. 47-67403

[52] U.S. Cl.................................. 354/51, 354/173
[51] Int. Cl. ........................................... G03b 7/08
[58] Field of Search ............. 95/10 CT; 354/51, 173

[56] References Cited
UNITED STATES PATENTS
3,348,462   10/1967   Fahlenberg.................. 95/10 CT X
3,762,285   10/1973   Tenkumo...................... 95/10 CT X

*Primary Examiner*—Samuel S. Matthews
*Assistant Examiner*—Michael L. Gellner
*Attorney, Agent, or Firm*—Toren, McGeady and Stanger

[57]     ABSTRACT

A release device for a camera having such memory type electronics time control device that in case when the repeating cycle of continuous photographing is of short period, the photometric value of the first one frame is memorized and subsequent photographing is continued based on said memorized value, while in case when the repeating cycle in continuous photographing is of long period, the photometric value is memorized for each frame so that photographing can be continuously done.

15 Claims, 3 Drawing Figures

RELEASE DEVICE FOR A CAMERA HAVING A MEMORY TYPE ELECTRONICS TIME CONTROL DEVICE

BACKGROUND OF THE INVENTION:

The present invention relates to a release device for a camera having such a memory type electronic time control device as useful particularly for the case when an electrically-driven wind up device is employed especially in an EE camera of a TTL photo-sensing single lens reflex type with a memory type electronics shutter.

DESCRIPTION OF THE PRIOR ART:

When photographing is done by a conventional TTL single lens reflex EE camera with a memory type electronic shutter having an electrically driven wind up device attached thereto, in case its photographing interval is of continuous photographing, the brightness of the plane of a built-in light receiving element varies in each release for photographing as the automatic diaphragm at a camera and a mirror function, then returns to an initial stage of photographing and the brightness of the plane of the light receiving element resumes its original value, but in the case when said repeated cycle is of short period and is shorter than the response time of the light receiving element, the amount of information from the light receiving element varies and the time limit of the shutter will be determined by transient properties of the light receiving element, therefore proper exposure cannot be secured, while in the case when said cycle is of a long period, said shortcoming will not take place, but improper exposure will be obtained in case of short cycle, thus it has been impossible to secure proper exposure all the way through.

One of the objects of the present invention is to eliminate the above-mentioned shortcomings, that is, when the photographing interval is of continuous photographing and its repeating cycle is of short period, only first frame is memorized then subsequent photographing is done while the memory of the first one frame is retained, so that the consecutive photographing will be done with such exposure value as being sensed before starting the photographing.

Another object of the present invention is to conduct consecutive photographing by memorizing the value of photometric sensing for each frame when the photographing interval is set at the continuous photographing and its repeating cycle is of long period, that is when the photographing is repeated with 1 second, 2 seconds . . . . . intervals.

Figure 1:
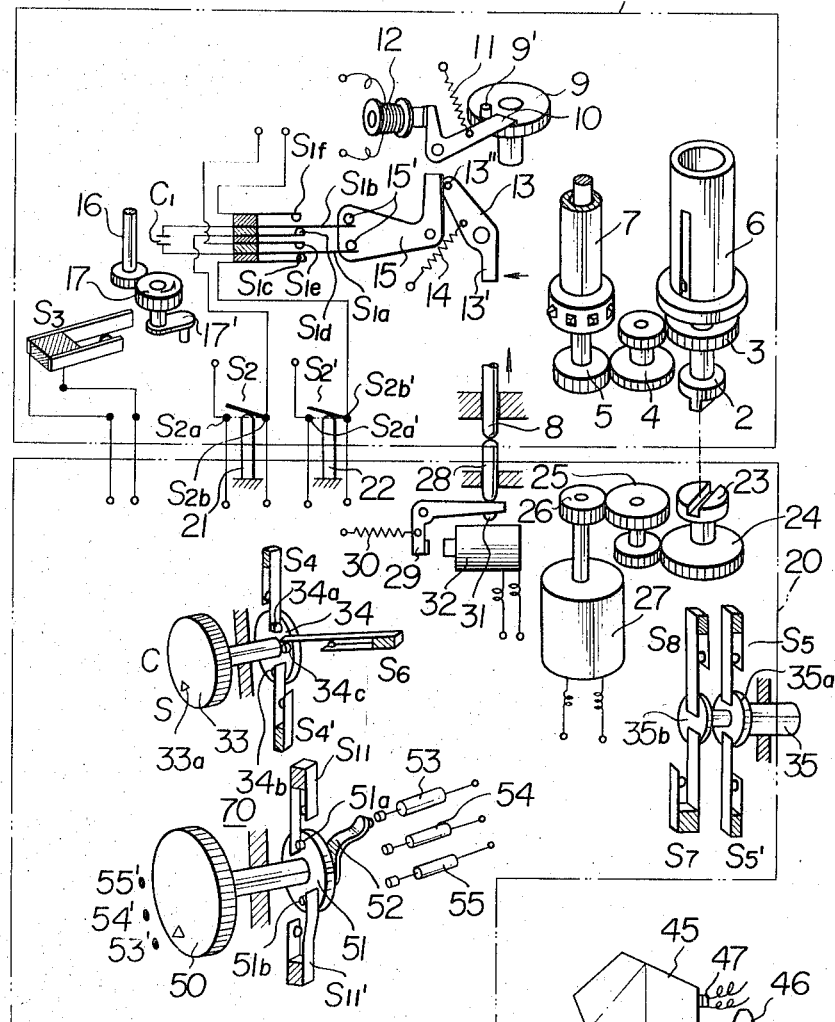
FIG. 1 shows one example of the present invention and is an arrangement drawing for entire device.
Figure 2:
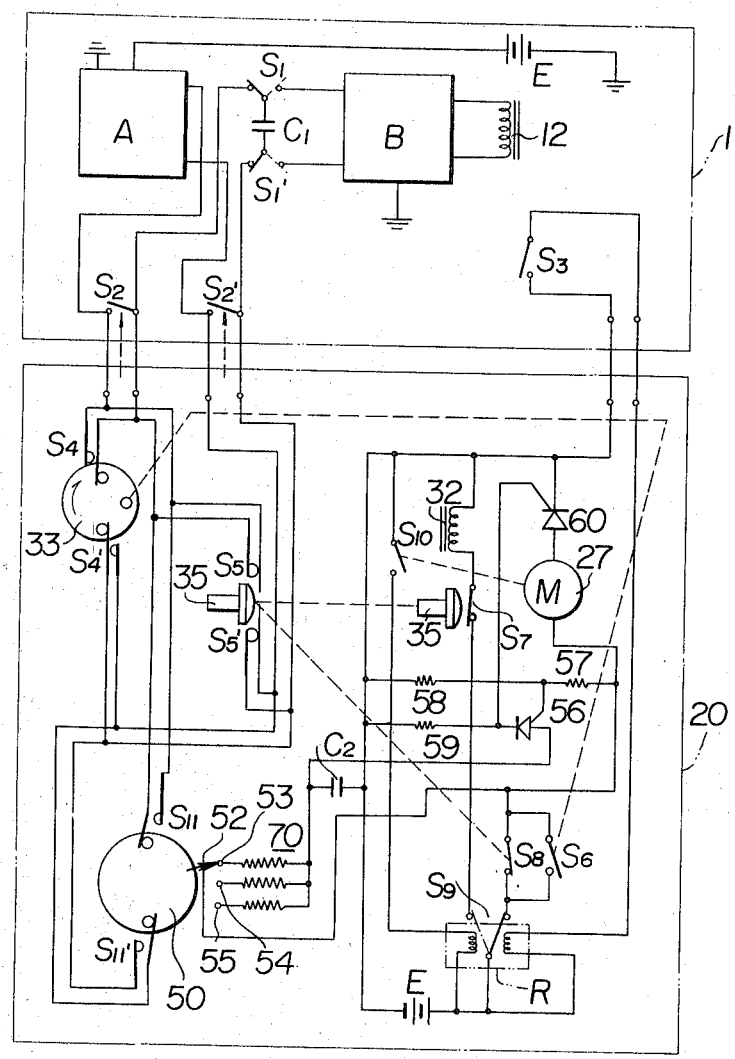
FIG. 2 is an electrical circuit diagram for the device shown in FIG. 1.

DESCRIPTION OF THE PREFERRED EMBODIMENTS:

One example of the present invention shall be explained referring to the drawings. FIG. 1 is to show the arrangement of the entire device, wherein 1 is a camera main body, 2 is a linking contacting piece for winding-up, 3, 4, 5 are driving gears in a winding up system, 6 is a spool for film take-up and is connected with an axle of the arm 2 by a conventionally known method. 7 is a sprocket and is connected with an axle of the gear 5. The gear 5 is also connected with a shutter driving system not shown in the drawing by a conventionally known method, thus the driving from the winding up system will be conveyed. 8 is a release pin at a camera installed in a slidable manner to the camera 1, and is to conduct release of a camera by a conventionally known method. 9 is a gear of a rear screen system of a shutter, and 9' is a pin planted on the rear screen gear 9. 10 is a lever to check the pin 9' of the rear screen gear 9, and its one end is in contact with an electromagnet 12 for holding the rear screen by a spring 11 which is placed on the lever 10. A spring for running the rear screen, which is not shown in the drawing, is provided for the rear screen system 9, and the spring 11 is so set as to have considerably smaller strength than that of said spring not shown. 13 is an automatic diaphragm linking lever and one end 13' of the 13 is being linked. The automatic diaphragm is provided in a conventionally known method and has such a structure that it is stopped down to the intended aperture, which is set before starting up of the shutter, by release of a camera, then is returned to the original full aperture position when running of the shutter is completed. Therefore, the linking lever 13 makes same movement as that of the automatic diaphragm as it is linked with the automatic diaphragm. 13'' is a pin planted on the linking lever 13 to rotate a memory change over switch lever 15. 14 is a spring placed over the linking lever 13, and memory changeover switch contact pieces $S_{1a}$, $S_{1b}$ are pressed down through a pin on the 13'' against their own springiness by electrical insulation pin 15' being planted on the memory change over lever 15, thus the $S_{1a}$ contacts with and is conducted through with the $S_{1c}$ and the $S_{1b}$ with the $S_{1d}$. The function of the automatic diaphragm will be that by the release of a camera the contacting pieces $S_{1a}$, $S_{1b}$ are changed over to the $S_{1e}$ and $S_{1f}$ through lvers 13, 15. The switches $S_2$ and $S_2'$ are related with the above mentioned memory change over switch $S_1$, and one ends of the same are connected to the $S_{1c}$ and $S_{1d}$, wherein each of the switches $S_2$. $S_2'$ becomes OFF only when the electrically driven wind up device 20 is attached by the pins 21, 22 of insulating nature planted on the electrically driven wind up device 20. 16 is an axle for a rear screen coupled with the rear screen system 9 by a screen ribbon (not shown in the drawing), and one end of the same engages with the gear 17, and an arm 17' is integrally provided with the gear 17. The structure is so arranged that by running of the shutter screen the rear screen system 9 transmits the rotation to the rear screen axle while the gear 17 rotates in counter-clockwise direction, and the pin of insulating nature on the arm 17' will place the switch $S_3$ in ON state. The switch $S_3$ is placed in ON state near the position where the running of the rear screen system 9 of the shutter is completed. The parts to be described hereafter are located at the electrically driven wind up side 20. 23 is a connecting piece to be coupled with the link connecting piece 2 for wind up at the camera 1 side, and 24, 25, 26 are driving gears to transmit the rotation of the motor 27, and such a structure is provided between the motor 27 and the connecting piece 23 although not shown in the drawing that a signal is issued when the winding up is completed so as to stop the rotation of the motor 27 by a conventionally known method. 28 is a release pin linked with the pin 8 provided at the camera 1 side, and is slidedly moved by a release-linked lever 29. 30 is a spring placed over the release-linked lever 29. 31 is a stopper for the release lever 29. 32 is a release electro magnet for pushing up the release pin 8 of the camera 1. 33 is a knob to change over a single frame feeding S and a continuous feeding C at the electrically driven wind up device 20. 33a is a pointer mark to indicate the change over, and 34 is a change over switch disc fixed to the change over knob, and has pins 34a, 34b, 34c of insulating nature planted thereon. The switches $S_4$, $S_4'$ have the switch terminals $S_{2a}$, $S_{2b}$, $S'_{2a}$, $S'_{2b}$ of the above mentioned $S_2$, $S_2'$ connected thereto, respectively. A switch $S_6$ is connected in series to the motor 27 of the electrically driven wind up device 20, and when the switch $S_6$ is ON, continuous feeding will be made. 35 is a release button of the electrically driven wind up device 20, and can be pushed from outside of the electrically driven wind up device 20. 35a, 35b are disks of insulating nature being integrally made with the release button 35, and the switches $S_5$, $S'_5$ and $S_7$, $S_8$ are functioned thereby. The switches $S_5$, $S'_5$ are connected to the $S_2$, $S'_2$ in parallel with the switches $S_4$, $S'_4$. $S_7$ is a siwtch to make the electro-magnet 32 conducted through, and $S_8$ is a switch actuated in association with the switch $S_7$ to place the circuit of the motor in OFF state. 50 is a photographing interval change over knob of a photographing interval control device 70, and FIG. 1, FIG. 2 show the state wherein it is set to short time (the state in which the timer is almost in OFF state), wherein the photographing interval change over knob 50 has a disk 51 of insulating nature fixed to its axle, and pins 51a, 52b are planted on the disk. Switches $S_{11}$, $S'_{11}$ which are linked with pins 51a, 51b are provided in parallel with switches $S_4$, $S'_4$ and $S_5$, $S'_5$ which are linked, respectively, with the "continuous" "single frame" change over knob 33 and the release button 35. The disk 51 also has a brush 52 fixed thereto and said brush contacts with resistances 53, 54, 55 depending on the set position of the knob 50, respectively. The resistance 53 is for protection of a uni-junction transistor 56 to be described below, and the time constant factor by CR circuit is set very closely to OFF. 54, 55 are resistances for long time photographing interval.

FIG. 2 is to show exposure time control of a camera applied to FIG. 1. In FIG. 2, E is a power source, A is an information input circuit built in the camera 1, and such information enters thereinto as the information on a light receiving element 47, diaphragm signal, film sensitivity signal. B is a high impedance input regeneration circuit for regeneration of shutter time, changing over a capacitor $C_1$ for memorizing. Said memory use capacitor $C_1$ is of such type as always retaining the information amount placed thereinto so far whenever information from the information input circuit A does not come thereinto. This is the method as disclosed by the applicant in his previously filed Japanese Patent Applications, Sho 45-6146, Sho 45-23942, Sho 45-43511.

$S_3$ is a switch to be closed as the rear screen returns, and $S_{10}$ is a switch linked with the motor 27 and closed when wind up is completed. Switches $S_4$, $S'_4$ are connected together with switches $S_{11}$, $S'_{11}$ in parallel with the switches $S_2$, $S'_2$. Further, switches $S_5$, $S'_5$ are connected in parallel also.

$C_2$ is a time constant circuit capacitor being connected in series with one of the resistances 53, 54, 55 and terminal of the capacitor is connected to the anode of the SCR. 57, 58, 59 are resistances for limiting current. $S_6$ is a contact which is closed in association with a change over knob 33 when said knob is changed over to continuous photographing state. $S_7$, $S_8$ show switches which are linked with the release button 35. R is a latching relay, and $S_9$ is a contacting piece which is changed over by said latching relay R.

When the pointing mark on the knob of the timer is matched to 53', after such time constant factor, from the time when the brush 52 contacts with the resistance 53 and the switch $S_9$ of the latching relay R is conducted to the $S_{9a}$, as determined by the time constant circuit with the resistance 53 and the capacitor $C_2$ and by the trigger setting voltage of the UJT56 set by the resistances 58, 59, the UJT56 becomes ON, and the output from the load resistance 59 connected to the cathode is impressed to the gate of the SCR59, and the SCR60 becomes ON. Then the motor 27 with the load of SCR60 starts rotation, and at this time as the resistance 53 is set with small value the motor 27 starts rotation with short quiescent time and timer is at OFF state. When the wind up is completed the switch $S_{10}$ becomes ON and as the switch $S_9$ of the latching relay R is conducted to the $S_{9a}$, the SCR59 becomes OFF, then the motor 27 is stopped. When photographing is done with the above mentioned state as the timer is at OFF state, the switches $S_{11}$, $S'_{11}$ are in OFF state and the retention of memory entirely depend on the setting position of the change over knob 33, and no effect is given when the timer is in OFF state.

Figure 3:
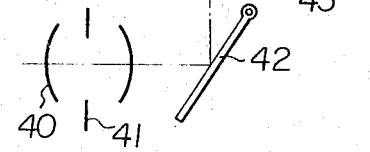
FIG. 3 is an optical arrangement for the camera shown in FIG. 1.

FIG. 3 shows an optical system in the camera shown in FIG. 1. 40 is a photographing lens, 41 is a diaphragm, 42 is a reflecting mirror, 43 is a focusing plate, 44 is a condensor lens, 45 is a pentagonal prism, 46 is an eyepiece, and 47 is a light receiving element to sense the penetrating beam from the photographing lens.

The function of the device of the present invention shall be explained in the above mentioned set-up. The phase shown in FIG. 1 and FIG. 2 is to show the state before completion of wind up at the time of single frame photographing, wherein the driving force of the motor 27 performs feeding of film and charging of shutter through the gears 26, 25, 24, the contacting pieces 23, 2, the gears 3, 4, 5, then as the wind up and shutter charge at the camera 1 side is completed the motor 27 issues wind up completion signal placing the switch $S_{10}$ in ON state, and the switch $S_9$ of the latching relay R is changed over from the $S_{9b}$ to the position $S_{9a}$ as shown by dotted line, then the motor circuit is cut off and the release circuit is conducted through. In this state the camera 1 and the electrically driven wind up device is stopped. By pressing of the release button 35 the switch $S_7$ becomes ON and the releasing electromagnet 32 works, and the release lever 29 is attracted against the spring 30, thus the release at the camera 1 side is done through the pins 28, 8. By the release at the camera 1 one end 13' of the automatic diaphragm linking lever 13 is pushed to a direction shown by an arrow mark against the spring 14, and the memory change over switch lever 15 is rotated in clockwise direction through the 13'' by the spring force of the contacting pieces $S_{1a}$, $S_{1b}$ for memory change over switch. And the memory change over switch contacting piece $S_{1a}$ is changed over from the conductance of $S_{1c}$ to $S_{1e}$. In a same manner as above $S_{1b}$ is also changed over from the conductance of $S_{1d}$ to $S_{1f}$. In this state as the pointing mark 33a of the change over knob 33 of the electrically driven wind up device 20 is set at the single frame photographing position S, the switches $S_4$, $S'_4$ are in ON position, and as the electrically driven wind up device 20 is attached to the camera 1, even if the insulating pins 21, 22 push up the switches $S_2$, $S'_2$ making OFF state, as the $S_4$, $S'_4$ are ON as mentioned above, the information from the information input circuit A of the camera 1 is stored at the capacitor C. While the switches $S_5$, $S'_5$ become OFF by pressing the release button 35, as the $S_4$, $S'_4$ are in parallel with $S_5$, $S'_5$, no effect is given to the camera 1 side. By said change over of the memory change over switch $S_1$, the capacitor C is changed over from the information input circuit A to the high impedance input regeneration circuit B. And the automatic diaphragm actuates the automatic diaphragm linking lever B and at the same time actuates its own atuomatic diaphragm mechanism, making the mirror to jump up and the front screen of the shutter to run. At this time a counting start up switch (not shown in the drawing) for the electronic shutter is actuated, and the high impedance input regeneration circuit B will have the electrification of the rear screen holding electro magnet 12 cut off, depending on the memorized voltage at the capacitor C, and the attracting power is released, then the rear screen checking lever 10 works against the spring 11, and the pin 9' of the rear screen gear 9 pushes out the lever 10, thus the rear screen runs. The rear screen axle 16 is rotated in association with the rear screen system 9 and the gear 17 is rotated in counter-clockwise direction, and the pin of the arm 17' places the switch $S_3$ in ON position at the position where the rear screen completes its running. At this time the gear 17 performs releasing of the stop down of the automatic diaphragm mechanism and returning of the mirror by a conventionally known method which is not shown in the drawing. By the release of the automatic diaphragm mechanism the lever 13 rotates the lever 15 in counter-clockwise direction through the pin 13'' by the spring 14, returning the memory change over switch contacting pieces $S_{1a}$, $S_{1b}$ to their original positions, making them conducted through to the information input circuit A, thus stopped at the first state. While the switch $S_9$ of the latching relay R is changed over from $S_{9a}$ to $S_{9b}$ and is conducted through to the motor circuit as the switch $S_3$ becomes ON, since the release button 35 is being pressed the switch $S_8$ is in OFF state and the motor 27 will not rotate. By releasing the pressing of the release button 35, the switch $S_8$ becomes ON and the motor 27 rotates and same action as above is repeated then stopped and the switch $S_9$ of the latching relay R is changed over to $S_{9a}$ and such state is retained. Then returning to the first explanation above and the same process as above is followed, thus a single frame photographing is completed. However, the switch $S_3$ is linked with the wind up and the shutter charge and the front screen and the rear screen are charged, then the gear 17 is rotated in clockwise direction, becoming OFF state.

Next, in case of continuous photographing, the change over knob 33 of the electrically driven wind up device 20 is rotated to the direction of an arrow shown in FIG. 2 and the pointer mark 33a is set at the continuous feeding C. Then the switches $S_4$, $S'_4$ become OFF state and the switch $S_6$ is changed over to ON state by the insulating pin 34C of the change over knob 33. When the release button 35 is pushed in the above mentioned state, the switch $S_7$ of the release circuit becomes ON same as in the above mentioned single frame feeding, and the release electro-magnet 32 works and the release of the camera 1 works. While the switch $S_8$ which functions in an association with the release button 35 is in OFF state at that time, since the switch $S_6$ is in ON state, the switch $S_9$ of the latching relay R is changed over from $S_{9a}$ to $S_{9b}$ when the rear screen completion signal switch $S_3$ of the camera 1 becomes ON, and a motor circuit is formed, then the motor 27 is driven to wind up the camera 1, and the latching relay R is changed over by the wind up completion signal, thus a release circuit is formed. And the motor 27 is driven, the camera 1 is wound up, and the latching relay R is changed over, thus a release circuit is formed. While the release button 35 is being pressed, the same action as above is repeated and the continuous photographing is done. Here an important thing in the above state is the switches $S_5$, $S'_5$ which is in parallel with the switches $S_4$, $S'_4$. As the $S_5$, $S'_5$ are in OFF state by pressing of the release button 35, the switches $S_2$, $S'_2$ at the camera 1 side are kept retained in OFF state, and no amount of information enters from the information input circuit A and the information amount just before the release button 35 is pressed is memorized, thus proper exposure for each photographing is retained, and the high impedance input regeneration circuit B regenerates the voltage memorized in the capacitor $C_1$ by the voltage stored at the capacitor $C_1$, without consuming the same in each time. Next, when a timer is used, the pointing mark of the photographing interval change over knob 50 is matched to 54' or 55' and the change over knob 33 is set to the continuous feeding C. In this state $S_4$, $S'_4$ are in OFF state while $S_{11}$, $S'_{11}$ are ON state, and even if the release button 35 is placed in OFF state as each switch is arranged in parallel, as long as the switches $S_{11}$, $S'_{11}$ are ON, memory is renewed each time release of the camera 1 is made even in continuous feeding. However, in this case as the interval after each of the continuous feeding is one second or more, no effect is received from the light receiving element 47. The drawings show such case that photographing interval for each time is determined by such time constant factor as determined by the resistances 54, 55 as described above, and the counting of the time of photographing interval is started from the moment the switch $S_9$ of the latching relay R is conducted through to $S_{9b}$ as the shutter completion signal switch $S_3$ becomes ON, then the rotation of the motor 27 is stopped for a predetermined length of time and is rotated by the signal from the CR time constant circuit. However, such timer as defining the photographing interval by a shutter release signal or by a shutter timer starting signal may be started. Also concerning the circuit of the timer, even when it is not as built in as explained in this invention, an auxiliary timer may be attached additionally from outside, then linking with the change over knob 33 and the release button 35 can be secured. This is possible by providing the photographing interval change over knob 50.

As has been explained above in a TTL light sensing single lens reflex electronic shutter EE camera to which an electrically driven wind up device may be attached or may be built in, when photographing cycle is of short period, as a release button is pressed facing an object to be photographed, without any additional handling before photographing, such information amount of brightness as corresponding to the object at that time is memorized and retained, thus continuous photographing can be made with proper exposure as long as a release button is kept pressed. Also when the pressing of a release button is released and then is pressed again, the previous information amount will not be memorized, instead new information amount can be memorized and retained without any additional handling.

Also when the photographing cycle is set at long period cycle, information amount is memorized and retained each time and photographing can be made in a same state as the case when a camera is used by itself.

As the present invention has above mentioned arrangement, foolproof function can be surely secured for photographing purpose intended without any re-setting operation, thus the work or burden of a camera operator can be reduced and very sure method is provided.

While description in the above example was made of an attachment type to additionally mount a wind up device to a camera, it does not necessarily have to be separately provided to a camera, it can be built in a camera, yet same effect may be secured.

What is claimed is:

1. Camera having an automatic exposure control device comprising a light receiving transducer element for producing an exposure signal, exposure signal storage means having a capacitor for storing an exposure signal responsive to the output from the transducer element, exposure control means for controlling an exposure in said exposure signal storage means, release means for actuating the control means to produce an exposure, retaining means for retaining the signal in said storage means for multiple exposures regardless to successive release operations, and a setting means for transferring said retaining means from a non-retaining condition to retaining condition, thereby multiple exposure being achieved without successive exposure signal holding operations.

2. Camera according to claim 1, which further comprises an interval timer coupled with the setting means for defining time interval between an exposure and the next exposure.

3. Camera according to claim 1, which further comprises a displaying means for indicating whether the retaining means is in the retaining condition or not.

4. A camera according to claim 1, which further comprises an accessory unit having a setting member for said setting means and adapted to cooperate with a camera unit.

5. In a camera having an electronic shutter time control device and facilities for exposing a succession of film segments on a film at a cyclic rate during a manually selectable interval, the improvement which comprises, reference means for producing a reference voltage in accordance with an exposure factor such as brightness of objects to be photographed, a holding capacitor, exposure control means for defining a shutter duration corresponding to the value of a voltage applied thereto, first switching means operative when in a first position for connecting the producing means to the holding capacitor for storing the reference voltage and operative when in a second position for connecting the holding capacitor to the exposure control means to set the shutter duration corresponding to the value of the voltage stored across the holding capacitor, second switching means rendered effective upon the initiation of the selectable interval for changing the first switching means from the first to the second position, change-over means for selecting between a relatively slow cyclic rate and a relatively fast cyclic rate, wind-up control means responsive to the selected cyclic rate for effecting winding of the film following each exposure, third switching means normally operative after the initiation of the selectable interval for changing the first switching means from the second position to the first position following the conclusion of each exposure and for subsequently changing the first switching means from the first position to the second position at the conclusion of the next succeeding film winding operation, and means rendered effective when the relatively short cyclic rate is selected for preventing the third switching means from changing the first switching means from the second position to the first position until the conclusion of the manually selectable interval whereby the holding capacitor retains the same value of reference voltage during such interval.

6. A camera according to claim 5, which further comprises a fifth switching means connected in parallel with the third switching means.

7. A camera according to claim 5, which further comprises a fifth switching means connected in parallel with the third switching means.

8. A camera according to claim 5, in which the wind-up control means comprises an interval timer for setting the length of the exposure cycle.

9. A camera according to claim 5, in which the camera further comprises means for housing the combination of the change-over means, the wind-up control means, the third switching means, and the fourth switching means in a package separate from the remainder of the camera.

10. A camera according to claim 5, in which the camera further comprises a time constant circuit associated with the change-over means for delaying the start of operation of the wind-up control means in accordance with the cyclic rate selection of the change-over means.

11. A camera according to claim 10, in which the time constant circuit comprises a plurality of resistors connected in parallel, and a capacitor connected to one of the plurality of resistors.

12. A camera according to claim 5, in which the wind-up control means comprises, in combination, a power source, a driving means connected to the power source, a magnetic member connected in parallel to the driving means for initiating each exposure, and a latching relay connected between both terminals of the power source and operative for alternating the operation of the magnetic member and the driving means.

13. A camera according to claim 12 in which the driving means is connected in series with a semiconductor element which is triggered "on" by the electrical output of the wind-up control means.

14. A camera according to claim 13, in which the camera further comprises, normally disabled fifth switching means for interconnecting the power source and a magnetic member, and means responsive to the initiation of the manually selectable interval for enabling the fifth switching means.

15. A camera according to claim 13, in which the camera further comprises, normally enabled fifth switching means for interconnecting the power source and the driving means, and means responsive to the initiation of the manually selectable interval for disabling the fourth switching means.

* * * * *